Oct. 1, 1963     B. O. BURSON     3,105,932
ELECTRICAL POWER SUPPLY SYSTEM
Filed Feb. 10, 1961
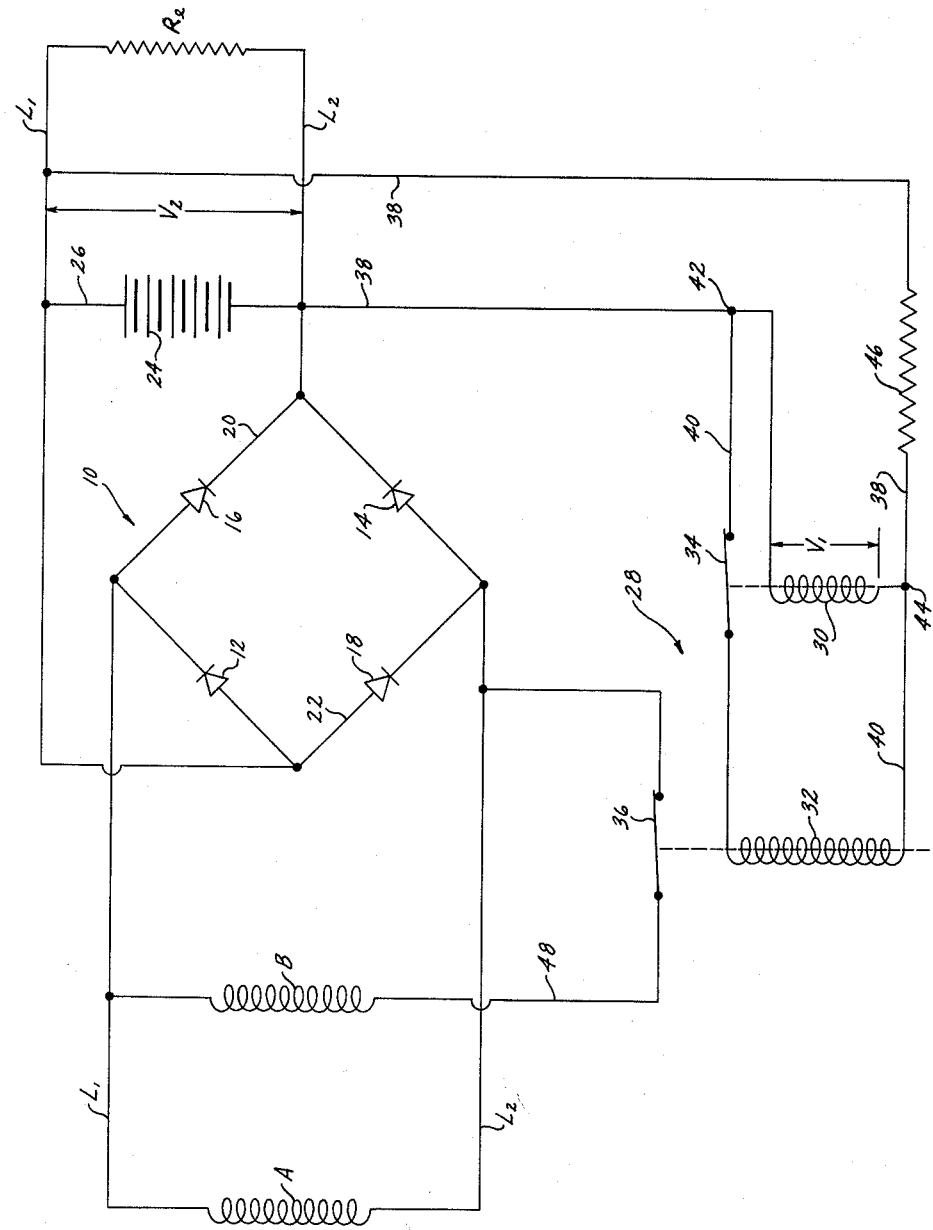
INVENTOR.
BOB O. BURSON
BY Taller, McCormick, Paulding & Huber
ATTORNEYS

United States Patent Office 3,105,932
Patented Oct. 1, 1963

3,105,932
ELECTRICAL POWER SUPPLY SYSTEM
Bob O. Burson, Longmeadow, Mass., assignor, by mesne assignments, to Elci Products Corporation, Carolina, Puerto Rico, a corporation of Puerto Rico
Filed Feb. 10, 1961, Ser. No. 88,505
5 Claims. (Cl. 322—90)

This invention relates generally to electrical power supply systems and, more particularly, to power supply systems of the type which comprise a permanent magnet alternator, a battery connected with the alternator so as to be charged thereby and so as to provide an alternative power supply, and an apparatus for regulating the alternator output.

It is the general object of the invention to provide an electrical power supply system which includes primary and secondary alternating current power sources and which also includes a regulating apparatus for selectively connecting the secondary power source with a load, the said regulating apparatus being operable to effect connection and disconnection of the secondary power source with the load responsive to changes in the voltage drop across the load in a more efficient manner than has heretofore been possible.

A more specific object of the invention is to provide an electrical power supply system of the type mentioned wherein first and second groups of permanent magnet alternator coils constitute the first and second power sources, wherein a battery is connected with said power sources so as to be charged thereby and so as to serve as an alternative power supply, and wherein the regulating apparatus is operable responsive to changes in the battery charging voltage.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single FIGURE of the drawing is a schematic illustration of a power supply system embodying the present invention.

An electrical power supply system comprising a preferred embodiment of the invention and which is shown in the drawing includes a permanent magnet alternator, rectifying means, and a battery, and the system is particularly adapted for use with an internal combustion engine. It is to be understood, however, that the invention is not limited to power supply systems so adapted. The permanent magnet alternator is or may be conventional and first and second groups of armature coils A and B of the alternator are shown in schematic form only. Said groups of coils A and B constitute first and second or primary and secondary alternating current power sources and they are connected in parallel relationship with each other between first and second lead lines $L_1$ and $L_2$.

The lead lines $L_1$ and $L_2$ extend to a load $R_1$ which, in the preferred embodiment of the invention, may comprise a starting device for an internal combustion engine, one or more lights, etc. Such a load will of course have a variable power requirement or demand on the power supply.

Connected in circuit with the groups of armature coils A and B and in circuit with the load $R_1$ is a rectifying means indicated generally at 10. Said rectifying means provides a direct current supply for the load $R_1$ and may be conventional in form. As shown, the rectifying means 10 comprises first and second rectifiers 12 and 14 connected respectively in the lead lines $L_1$ and $L_2$ and third and fourth rectifiers 16 and 18 disposed respectively in connecting conductors 20 and 22. The connecting conductors 20 and 22 form a bridge with the lead lines $L_1$ and $L_2$ to provide a conventional full wave bridge rectifying network.

The power supply system shown also includes a battery 24 connected between the lead lines $L_1$ and $L_2$ in a conductor 26. It will be apparent that the battery 24 is thus connected in circuit with the groups of coils A and B of the permanent magnet alternator so as to be charged by said coils. Further, it will be seen that the battery can serve as an alternative power supply for the load $R_1$ comprising the starting device, lights, etc.

In order that the battery 24 will not be overcharged and will yet be charged at a high rate when required, it is necessary that apparatus for regulating the output of the permanent magnet alternator be provided. A regulating apparatus indicated generally at 28 fulfills this need by selectively connecting and disconnecting one of the power sources, or groups of armature coils A and B, from the lead lines $L_1$ and $L_2$. Said apparatus is operable responsive to the voltage drop across the load $R_1$ and the voltage drop across or the charging voltage of the battery 24 and efficiently connects and disconnects the group of armature coils B so as to regulate alternator output in the desired manner.

The regulating apparatus 28 is shown as comprising first and second relay coils 30 and 32 and first and second switches or switch means 34 and 36 operated respectively by said coils. The relay coils 30 and 32 are connected in parallel relationship with each other respectively in conductors 38 and 40. The conductor 38 extends to the lead lines $L_1$ and $L_2$ to connect the first relay coil 30 in parallel with the battery 24 and the load $R_1$. The conductor 40 joins the conductor 38 at junctions 42 and 44 to connect the second relay coil 32 in parallel with said first relay coil 30. Disposed in the conductor 38 between the lead lines $L_1$ and $L_2$ and the first relay coil 30 is a resistor 46.

The first switch or switch means 34 is of the normally closed type and is moved to an open position upon energization of the first relay coil 30. More specifically, the switch 34 is open when the voltage drop across, or the current through, the first relay coil 30 exceeds a predetermined level. Said switch is disposed in the conductor 40 so as to connect the relay coil 32 with the conductor 38 and the lead lines $L_1$ and $L_2$ when in its closed position. Thus, energization and de-energization of the second relay coil 32 is effected by closing and opening movements of the switch 34 and is controlled by the first relay coil 30.

The second switch 36 is disposed in a conductor 48 which connects the group of armature coils B with the lead lines $L_1$ and $L_2$ in parallel relationship with the group of armature coils A. Thus, opening and closing movements of the switch 36 respectively connect and disconnect the coils B from the lead lines $L_1$ and $L_2$ and effect high and low levels of alternator output. The switch 36 is of the normally open type and is closed by the second relay coil 32 when said coil is energized. The coil 32 is adapted to energize whenever the aforementioned first switch 34 is closed to connect said coil with the conductor 38 and the lead lines $L_1$ and $L_2$ through the conductor 40.

In operation of the regulating apparatus 28, the switch 34 is open and closed respectively when the voltage drop $V_1$ across the relay coil 30 is above and below the aforementioned predetermined level. The voltage drop $V_1$ is related to the voltage drop $V_2$ across the battery 24 and the load $R_1$ in a known manner and is dependent upon the voltage drop $V_2$, the value of the resistor 46, and the presence or absence of the relay coil 32 in parallel connection with the relay coil 30. More specifically, when the switch 34 is closed so as to connect the coil 32 in parallel with the coil 30, the voltage drop $V_1$ is dependent upon the instant voltage drop $V_2$, the voltage drop across the resistor 46, and the voltage drop between the junctions 44 and 42, this last-mentioned drop being determined by the total effective resistance of the parallel coils 30 and 32. When the switch 34 is open, the voltage drop $V_1$ is dependent upon the instant voltage drop $V_2$, the voltage drop across the resistor 46, and the voltage drop between the junctions 44 and 42, the last-mentioned drop being determined by the resistance of the relay coil 30 alone. Now, since the resistance of relay coil 30 taken alone is greater than the total effective resistance of the coils 30 and 32 connected in parallel, the voltage drop $V_1$ will be larger in magnitude when the switch 34 is open than when the said switch is closed for a given instant voltage drop $V_2$.

From the foregoing, it will be apparent that the relay coils 30 and 32 and the resistor 46 may be selected to provide for opening of the switch 34 when the voltage drop $V_2$ reaches a level equal to the charging rate of the battery 24 (say 15 volts for a 12 volt battery). On opening of the switch 34, the second relay coil 32 will be de-energized permitting the switch 36 to open whereby to disconnect the group of armature coils B from the lead lines $L_1$ and $L_2$ and to thereby prevent overcharging of the battery 24. On opening of the switch 34, there also occurs an instantaneous increase in the magnitude of the voltage drop $V_1$ across the coil 30, this being due to the dropout of the coil 32 and the resulting increased effective resistance of the coil 30 in the circuit. The increased voltage drop $V_1$ across the coil 30 provides a dead band in the operation of the switch 34 and the said switch will not resume a closed position until the voltage drop $V_2$ has been reduced to a preselected level substantially below 15 volts. Thus, there will be no tendency for the switch 34 to chatter and to cause corresponding chatter operation of the switch 36.

On subsequent reduction of the voltage drop $V_2$ to the said preselected level below 15 volts, the voltage drop $V_1$ across the coil 30 will be reduced to a level which permits the switch 34 to close. This effects closing movement of the switch 36 through energization of the second relay coil 32 and the group of armature coils B are thereby connected in circuit with the leads $L_1$ and $L_2$ to provide for alternator output at a high level and a desirably high rate of battery charging. Closing of the switch 34 also effects an instantaneous reduction in the voltage drop $V_1$ across the coil 30 due to the reconnection of the relay coil 32 in the circuit and the resulting decrease in effective resistance of the coil 30. Thus, the switch 34 will not reopen until the voltage drop $V_2$ again exceeds 15 volts and chatter of the switch 34, as well as resulting chatter of the switch 36, is positively avoided.

From the foregoing, it will be apparent that the power supply system of the present invention is characterized by simplicity and by efficient automatic regulation of load or battery voltage. Due to the provision of the dead band in the operation of the switches 34 and 36, positive opening and closing movements of the switches are provided for with the complete elimination of chatter. The inclusion of the resistor 46 in circuit with the relay coils in the particular manner shown provides for the desired dead band in switch operation in a simple and direct manner.

The invention claimed is:

1. In an electrical power supply system, the combination of an electrical load, first and second lead lines connected with the load, first and second alternating current power sources connected with said lead lines in parallel relationship with each other, first and second relay coils connected with said lead lines between said load and said power sources in parallel relationship with each other, a first switch means operable to selectively connect said second relay coil with said lead lines, said first switch means being operated by said first relay coil responsive to changes in the voltage drop across said load, a second switch means operable to selectively disconnect one of said power sources from said lead lines, said second switch means being operated by said second relay coil, and resistance means connected in series relationship with said first and second relay coils and between the said coils and said lead lines to provide a dead band and to prevent chatter in the operation of said first and second switch means.

2. In an electrical power supply system, the combination of an electrical load, first and second lead lines connected with the load, first and second alternating current power sources connected with said lead lines in parallel relationship with each other, rectifying means connected in circuit with said lead lines to provide a direct current power supply, a battery connected across said lead lines between said rectifying means and the load, first and second relay coils connected with said lead lines between said rectifying means and the load in parallel relationship with each other, a first switch means operable to selectively connect said second relay coil with said lead lines, said first switch means being operated by said first relay coil responsive to changes in the voltage drop across said battery and load, a second switch means operable to selectively disconnect one of said power sources from said lead lines, said second switch means being operated by said second relay coil, and resistance means connected in series relationship with said first and second relay coils and between the said coils and said lead lines to provide a dead band and to prevent chatter in the operation of said first and second switch means.

3. In an electrical power supply system, the combination of an electrical load, first and second lead lines connected with the load, a permanent magnet alternator having first and second groups of armature coils connected with said lead lines in parallel relationship with each other, first and second relay coils connected with said lead lines between said load and said armature coils in parallel relationship with each other, a first switch means operable to selectively connect said second relay coil with said lead lines, said first switch means being operated by said first relay coil responsive to changes in the voltage drop across said load, a second switch means operable to selectively disconnect one of said groups of armature coils from said lead lines, said second switch means being operated by said second relay coil, and resistance means connected in series relationship with said first and second relay coils between the coils and said lead lines to provide a dead band and to prevent chatter in the operation of said first and second switch means.

4. In an electrical power supply system, the combination of an electrical load, first and second lead lines connected with the load, a permanent magnet alternator having first and second groups of armature coils connected with said lead lines in parallel relationship with each other, rectifying means connected in circuit with said lead lines to provide a direct current power supply, a battery connected across said lead lines between said rectifying means and the load, first and second relay coils connected with said lead lines between said rectifying means and the load in parallel relationship with each other, a first switch means operable to selectively connect said second relay coil with said lead lines, said first switch means being operated by said first relay coil responsive to changes in the voltage drop across said battery and load, a second switch means operable to selectively disconnect one of said groups of armature coils from said lead lines, said second switch means being operated by said second relay coil, and resistance means connected in series relationship with said first and second relay coils and between the said relay coils and said lead lines to provide a dead band and to prevent chatter in the operation of said first and second switch means.

5. In an electrical power supply system, the combination of an electrical load, first and second lead lines connected with the load, a permanent magnet alternator having first and second groups of armature coils connected with said lead lines in parallel relationship with each other, rectifying means connected in circuit with said lead lines to provide a direct current power supply, a battery connected across said lead lines between said rectifying means and the load, first and second relay coils connected with said lead lines between said battery rectifying means and the load in parallel relationship with each other, a normally closed switch in circuit with said second relay coil and said lead lines and adapted to be opened to de-energize said second relay coil by energization of said first relay coil, said first relay coil being so energized when the voltage across said battery exceeds a preselected level, a normally open switch in circuit with one of said groups of armature coils and said lead lines and adapted to be closed on energization of said second relay coil, said second coil being so energized when said normally closed switch is closed, and resistance means connected in series relationship with said first and second relay coils and between the said relay coils and said lead lines to provide a dead band and to prevent chatter in the operation of said first and second switch means.

References Cited in the file of this patent
UNITED STATES PATENTS

| | | |
|---|---|---|
| 2,506,809 | Nims | May 9, 1950 |
| 2,900,591 | Jacob | Aug. 18, 1959 |